United States Patent
Lee et al.

(10) Patent No.: US 7,423,650 B2
(45) Date of Patent: Sep. 9, 2008

(54) METHOD OF REPRESENTING AND ANIMATING TWO-DIMENSIONAL HUMANOID CHARACTER IN THREE-DIMENSIONAL SPACE

(75) Inventors: Ji Hyung Lee, Taejon (KR); Sung Ye Kim, Taejon (KR); Bo Youn Kim, Taejon (KR); Hee Jeong Kim, Taejon (KR); Bon Ki Koo, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 248 days.

(21) Appl. No.: 11/438,278

(22) Filed: May 23, 2006

(65) Prior Publication Data

US 2007/0132765 A1    Jun. 14, 2007

(30) Foreign Application Priority Data

Dec. 9, 2005    (KR)    ...... 10-2005-0120324

(51) Int. Cl.
*G06T 15/00* (2006.01)

(52) U.S. Cl. .................. 345/473; 345/950
(58) Field of Classification Search ......... 345/473–475, 345/950, 951, 952
See application file for complete search history.

(56) References Cited

U.S. PATENT DOCUMENTS

| | | | |
|---|---|---|---|
| 5,982,350 A * | 11/1999 | Hekmatpour et al. | 345/629 |
| 6,331,861 B1 * | 12/2001 | Gever et al. | 345/629 |
| 6,535,215 B1 * | 3/2003 | DeWitt et al. | 345/473 |
| 6,559,845 B1 * | 5/2003 | Harvill et al. | 345/473 |
| 6,611,266 B1 * | 8/2003 | Pollack et al. | 345/427 |
| 6,912,305 B1 | 6/2005 | Finlayson et al. | |
| 6,914,603 B2 | 7/2005 | Shimoda et al. | |
| 6,931,656 B1 | 8/2005 | Eshelman et al. | |
| 7,225,114 B2 * | 5/2007 | Hayashi et al. | 703/6 |

FOREIGN PATENT DOCUMENTS

| | | |
|---|---|---|
| JP | 9-81775 | 3/1997 |
| KR | 10-2003-56294 | 7/2003 |
| KR | 10-2003-85249 | 11/2003 |
| KR | 10-2005-82859 | 4/2005 |

OTHER PUBLICATIONS

Raskar et al., Cartoon Dioramas in Motion, ACM, Jun. 2002, pp. 7-12.*

Hornung et al., Character Animation from 2D picture and 3D motion Data; ACM, Jan. 2007, pp. 1-9.*

* cited by examiner

*Primary Examiner*—Phu K Nguyen
(74) *Attorney, Agent, or Firm*—Lowe Hauptman Ham & Berner LLP

(57) ABSTRACT

There is provided a method of representing and animating a 2D (Two-Dimensional) character in a 3D (Three-Dimensional) space for a character animation. The method includes performing a pre-processing operation in which data of a character that is required to represent and animate the 2D character like a 3D character is prepared and stored and producing the character animation using the stored data.

7 Claims, 9 Drawing Sheets

(a)          (b)          (c)

METHOD OF REPRESENTING AND ANIMATING TWO-DIMENSIONAL HUMANOID CHARACTER IN THREE-DIMENSIONAL SPACE

BACKGROUND OF THE INVENTION

1. Field of the Invention

The present invention relates to a method of representing and animating a two-dimensional (2D) humanoid character in a three-dimensional (3D) space, and more particularly, to a method that can represent a 2D humanoid character according to views of the humanoid character taken by a camera in a 3D space and animates the 2D humanoid character according to a procedure of a 3D animation.

2. Description of the Related Art

The prior art method of making an animation is classified into a 2D animation method and a 3D animation method.

The 2D animation method is based on a 2D cell and the 3D animation method makes an animation by three-dimensionally preparing the animation and rendering the animation.

In the 2D animation method, after a key frame is first set, an original draft is drawn on a paper and the paper on which the original draft is drawn is moved to a cell to complete the key frame. Then, frames are interpolated in a space between the key frames through an in-betweening operation, thereby completing the overall animation.

In the 3D animation method, data are three-dimensionally modeled and a 3D animation is set to the modeled 3D and rendered, thereby completing the animation.

A character animation is an animation having a virtual character moving on a screen. Recently, as a computer graphic technology has been advanced, it has become possible to represent a humanoid character that moves like a human being. The character animation is classified in 2D and 3D character animations.

The 2D character animation is made through the 2D animation method and the 3D character animation is made through the 3D animation method.

The 2D character animation is simple like a conventional cartoon film or a flash animation. The motion of the 2D character animation is exaggerated. However, the motion of the 3D character animation is represented realistically like the human being. Therefore, the 2D character animation is manufactured through a key frame method to be proper to the cell animation. The 3D character animation is manufactured through a combination of a key frame method and a motion capture method.

In the key frame method, key frames are first set and the animation is completed by interpolating frames into a space between the key frames through the in-betweening operation. However, this process must be performed for each articulates of a human being that is an original model of the animation character, many efforts and a lot of time are necessary to produce the animation data. The data quality depends on the skill of a worker.

In the motion capture method for producing the 3D character animation, the data is produced by obtaining the motion like the real human being using an optical, mechanical or magnetic motion capture device. These data are used as the character animation. The motion capture method provides a very natural motion as it uses the motion of the human being as it is. However, since the data capacity is bulky, many efforts and a lot of time are required to post-process, amend, and change the data.

Recently, even when the animation is three-dimensionally produced, it is sometimes still required to represent a texture of the 2D cell animation using a cartoon shading or exaggerated motion. Therefore, a combination use thereof is eagerly required. However, due to the different production processes, it is difficult to use them together, and even when they are used together, it is difficult to utilize their typical advantages.

SUMMARY OF THE INVENTION

Accordingly, the present invention is directed to a method of representing and animating a two-dimensional (2D) humanoid character in a three-dimensional (3D) space, which substantially obviates one or more problems due to limitations and disadvantages of the related art.

It is an object of the present invention to provide a method that can represent and animate a 2D character together with a 3D character in a 3D space, thereby effectively producing an animation in which a character moves in the 3D space but provide a nonrealistic texture of the 2D character.

It is another object of the present invention to provide a method that can represent a 2D character in a 3D space in response to a 3D character animation data by solving drawbacks of the 2D and 3D characters when the 2D character is used together with the 3D animation.

That is, for the 2D character, it is difficult to amend the same and the reuse frequency thereof is low. The 3D character has advantages Accordingly, for the 3D character, the reuse frequency is high since it is not affected by, for example, a camera conversion as far as the scene setting is not changed. However, the initial production of the 3D character is difficult. Furthermore, when the data such as the motion capture are used, the motion is realistic and thus it cannot be used for the 2D cell animation. Therefore, it is another object of the present invention to solve the disadvantages of the 2D and 3D characters by combining the 2D character with the 3D animation.

In the prior art, the character animation has been two or three-dimensionally produced and the 2D and 3D production methods have been combined with each other only for the objects or camera animation other than characters. Therefore, it is still another object of the present invention to provide a method for combining the 2D and 3D production methods for the characters. That is, it is an object of the present invention to provide a method that can represent a 2D character according to views of the character taken by a camera in a 3D space and animates the 2D character according to a procedure of a 3D animation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of representing and animating a 2D (Two-Dimensional) character in a 3D (Three-Dimensional) space for a character animation, including: performing a pre-processing operation in which data of a character that is required to represent and animate the 2D character like a 3D character is prepared and stored; and producing the character animation using the stored data. The performing the pre-processing operation includes performing a character setup operation in which an appearance obtainable from a camera in the 3D space is prepared as the 2D character according to camera views and stored in a character database; and performing a motion data setup operation in which a 3D character animation is analyzed and mapped into a 2D character animation and stored in a motion database.

The producing the character animation includes searching and extracting key frame data from the motion database, the key frame data corresponding to location information of a camera and a posture of the character in the 3D space determined by an animation producer; converting coordinate using the location information of the camera and a motion value that is obtained at each key frame extracted from the motion database; searching key drawings of a character obtained from the conversion of the coordinate from the character database; converting the key drawings corresponding to the frames after searching a drawing order for body regions corresponding to the key drawings of the searched character from the motion data base; and performing an in-betweeing operation in which frames are interpolated in a space between a current key frame and a next key frame.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention.

A method of the present invention is realized by a system including a pre-processing unit for storing data prepared in advance in a database and an animation producing unit for producing a character animation using the data stored in the pre-processing unit.

Figure 1:
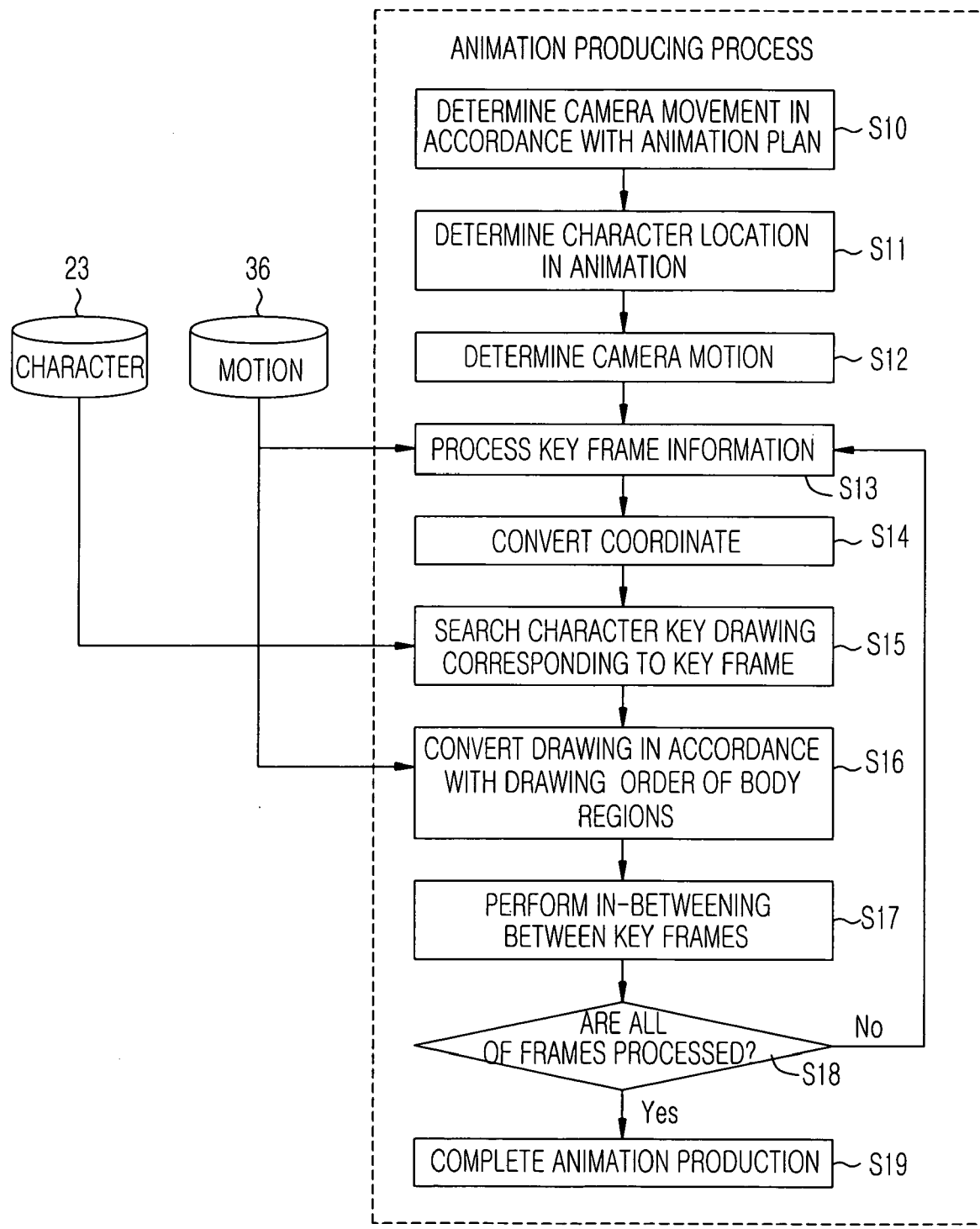
FIG. 1 is a flowchart for processing an animation using a 2D character when the animation is produced using a method of representing and animating a 2D humanoid character in a 3D space according to an embodiment of the present invention.

FIG. 1 is a flowchart for processing an animation using a 2D character when the animation is produced using a method of representing and animating a 2D humanoid character in a 3D space according to an embodiment of the present invention;

An animation producing method of the present invention includes pre-processing a predetermined data in a database and producing a character animation using the data stored in the database.

In the pre-processing operation, the data that will be used in producing the character animation is first prepared and the animation is produced through a process depicted in FIG. 1. The pre-processing operation will be described later with reference to FIGS. 2 through 10.

Figure 2:
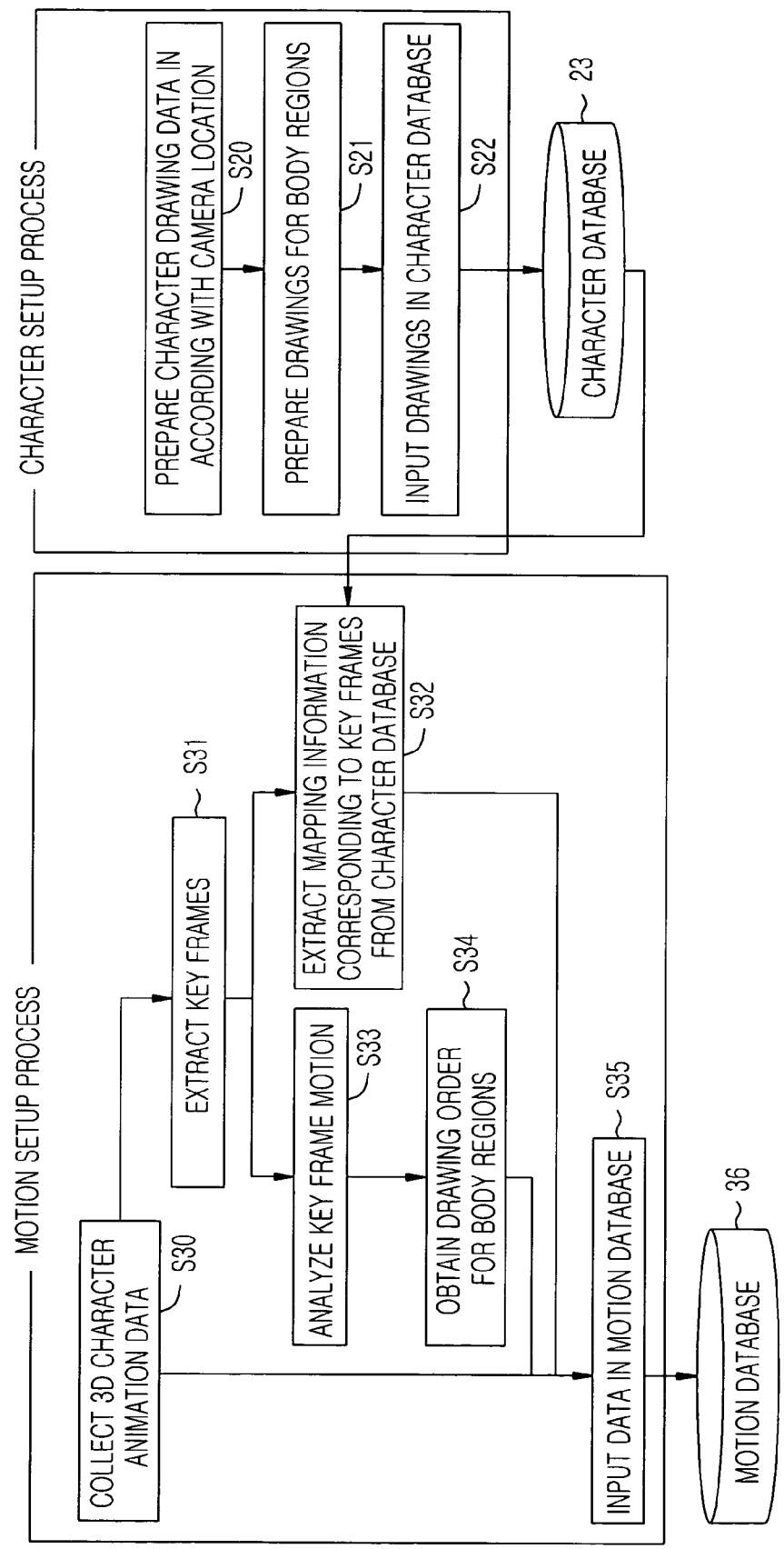
FIG. 2 is a flowchart of a pre-processing operation for storing data used for producing an animation in databases according to an embodiment of the present invention.

When the data is prepared through the pre-processing operation of FIG. 2, an animation producer identifies information of a scene and a character and determines a path of the camera (S10). Then, the animation producer determines a location where the character will be located in the scene (11). At this point, the animation producer also determines a motion the character will do (S12). Then, the data (key frame information) stored in the motion database 36 is read using the information determined as in the above (S13).

A motion value of each frame is calculated based on the key frames obtained from the motion database (36) and a coordinate conversion is performed using the motion values and camera information (S14). The orientation and size of the character can be identified from the coordinate conversion result of the motion data and a key drawing of the 2D character corresponding to the orientation and size of the character is extracted from the character database (S15).

Next, the drawing order with respect to the body regions stored in the motion database is detected to convert the drawing according to the order and the character drawing corresponding to the frame is completed (S16). Then, frames are interpolated into a space between first and second key frames through the in-betweening operation (S17). As a result, each frame between the first and second key frames also has a character. Next, the above operation is repeated for the next key frames so that all of the frames can have the character (S18). Then, when all of the frames are processed (YES), all of the frames are interconnected to complete an animation (S19). When the frames are not fully processed (NO), the key frame information is read from the motion database 36 (S13) and the operations (14-S18) are repeated.

FIG. 2 is a flowchart of a pre-processing operation for storing data used for producing an animation in databases 23 and 36 according to an embodiment of the present invention.

In the pre-processing operation, to represent a 2D character in a 3D space, a character that can be obtained from the camera in the 3D space is two-dimensionally produced in advance according to camera views. At this point, a 3D animation is analyzed and mapped as a 2D animation. The mapped 2D animation is stored in the databases. The pre-processing operation includes a character setup process and a motion data setup process.

Figure 7:
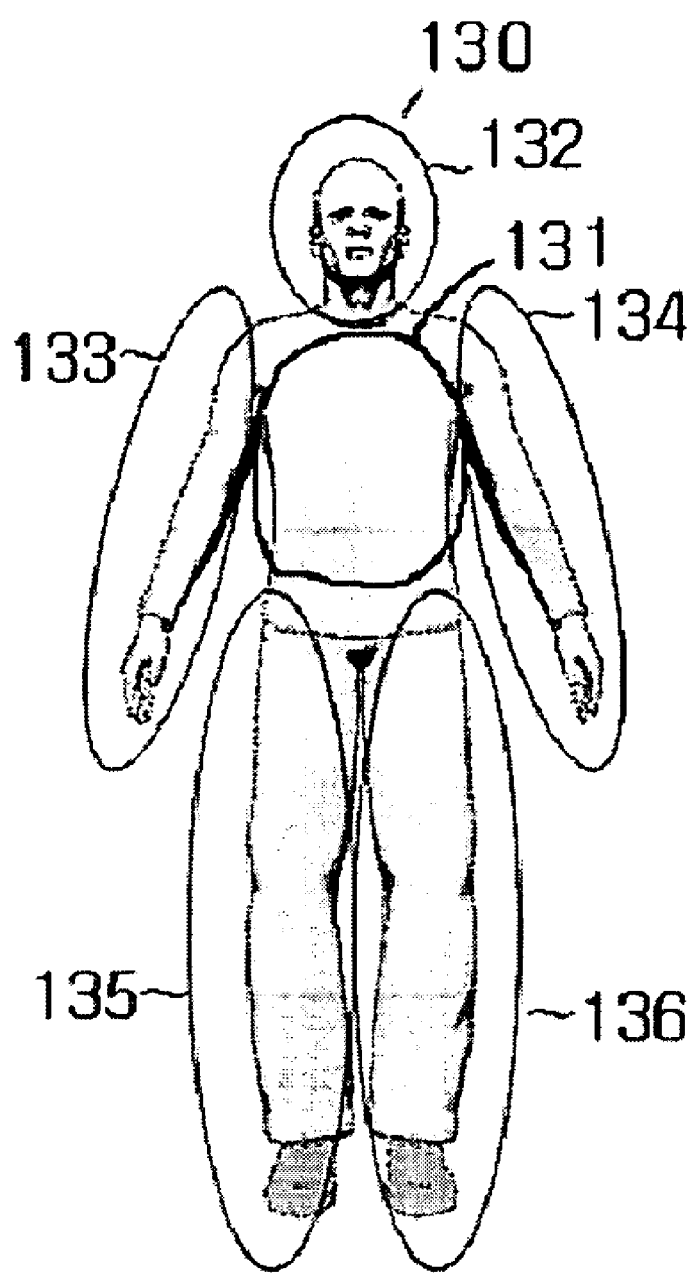
FIG. 7 is a view of a human body divided by regions for setting a drawing procedure of a character according to the present invention.

In the character setup process, 26 virtual locations are preset according to a camera location 104 that may be locatable in the 3D space (102) and a key drawing of the 2D character corresponding to a character obtainable at the camera location 104 is prepared as a drawing data (S20). Since the 3D character is formed in a hierarchy structure and thus the body regions such as hands and foots may move, the key drawing of the 2D character is divided to correspond to the body regions that can be obtainable at the 26 virtual locations and drawn and processed (S21). The division of the 2D character by the body regions is illustrated in FIG. 7. Thus, the hierarchy structure of the 3D character can be maintained in the 2D character. The key drawing of the character obtained by the above-described operation is inputted and stored In the motion data setup process, the character animation data produced as the 3D character data are collected (S30). The collected data are the motion capture data or the character animation data produced through the 3D key frame method. Then, key frames are extracted from the 3D character animation data (S31). 3D key frames are preset in the key frame data. However, 3D key frames are not preset in the key frame data. Thus, the user set the 3D key frames. When the extracted key frame data is applied to the 3D character, mapping information is extracted by searching camera location information of the 2D character corresponding in the character database 23 after identifying the appearance obtained at an camera angle and in a direction of the character (S32). Then, information relating to the mapping is stored in the motion database 36. After a motion of the 3D character corresponding to the motion of the extracted key frames is analyzed (S33), an order of the drawings of the body regions of the 2D character is determined (S34) and the determined order is stored in the motion database 36 (S35). At this point, the drawing order is calculated using a distance between an end-effect of each body region and a character body with reference to a camera view.

Figure 3:
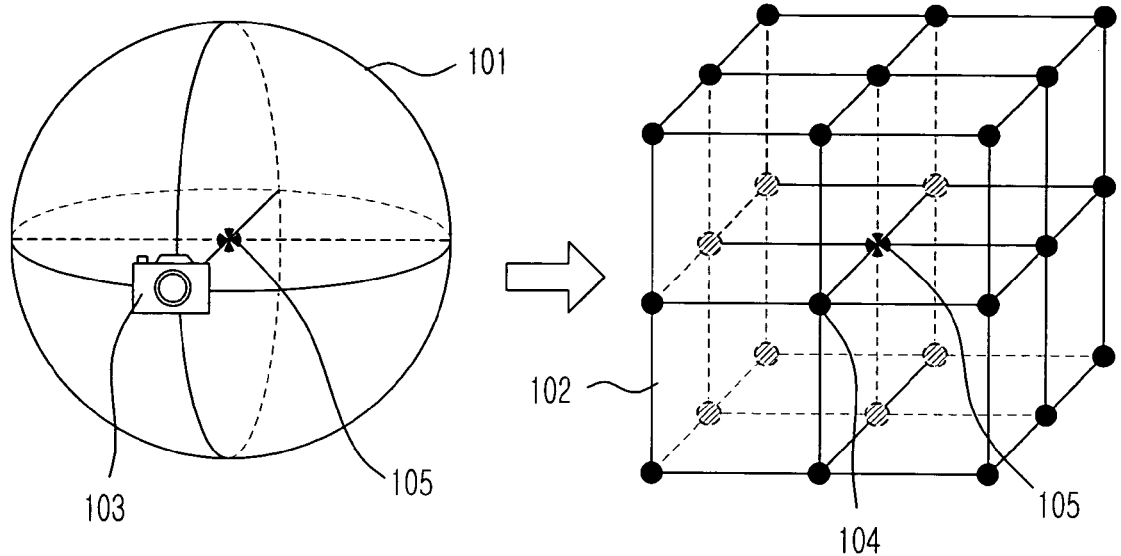
FIG. 3 is a diagram illustrating major locations of a camera that is defined in advance for setting up a character in the pre-processing operation.

FIG. 3 is a diagram illustrating major locations of a camera that is defined in advance for setting up the character in the pre-processing operation.

There is shown a virtual object 105 that is to be photographed in a virtual space. A diagram 102 schematically shows a track at a center of which a virtual object 105 that is to be photographed in a virtual space is located and camera locations are set as 26 orientations on the track. Therefore, a virtual character that can be taken by the virtual camera may be preset and stored in the character database 23.

Figure 4:
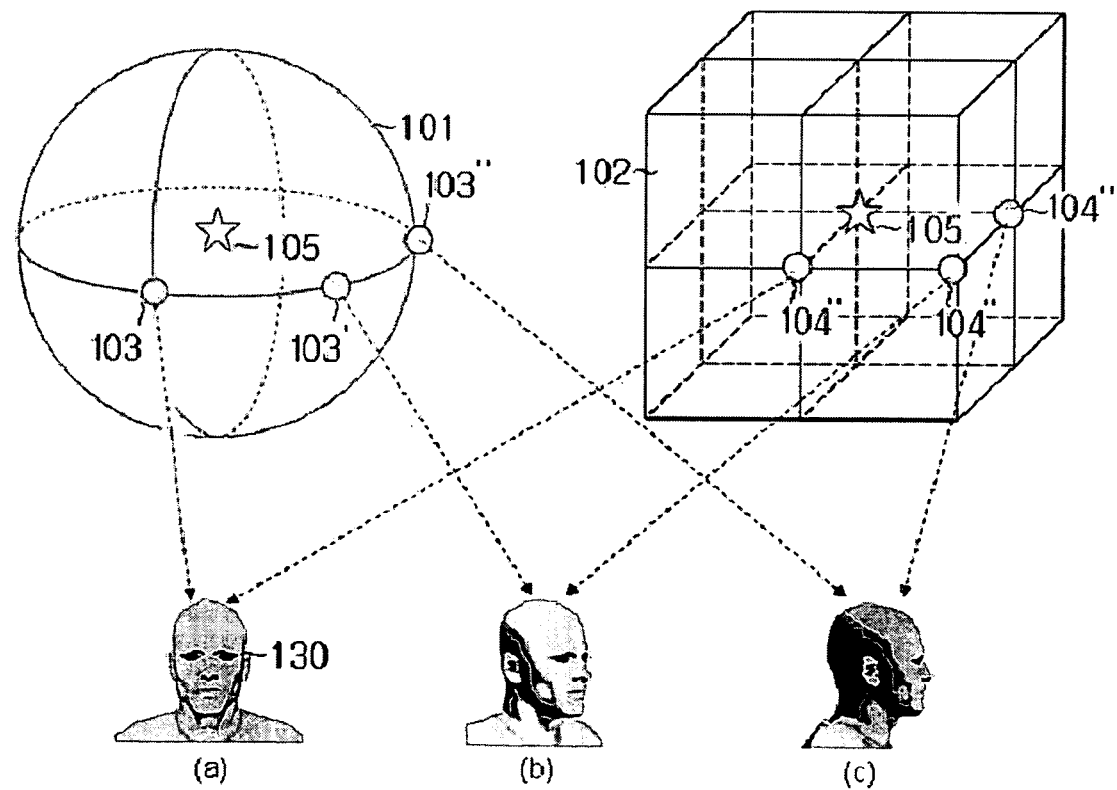
FIG. 4 is a view illustrating a character setup according to locations of the camera according to the present invention.

FIG. 4 is a view illustrating a character setup according to locations of the virtual camera of FIG. 3.

That is, FIG. 4 shows how locations on the camera track 101 in the virtual space, which correspond to the 26 orientations of the camera on the diagram 102, can be identified and how the character taken by the virtual camera at the camera locations 104 can be connected to the key drawing of the 2D character 130.

That is, a location of the camera is set on the track 102 that is formed by dividing the camera location into the 26 orientations in the track 101 of the virtual space and an appearance of the 2D character 130 taken at the camera location 103 in the virtual space and an appearance of the character taken at the camera location 104 on the track 102 are mapped (a). Also, an appearance of the 2D character 130 taken at the camera location 103' of the virtual space and an appearance of the character taken at the camera location 104' at the track 102 are mapped (b). An appearance of the 2D character taken at the camera location 103" of the virtual space and an appearance of the character taken at the camera location 104" at the track 102 are also mapped (c).

Figure 5:
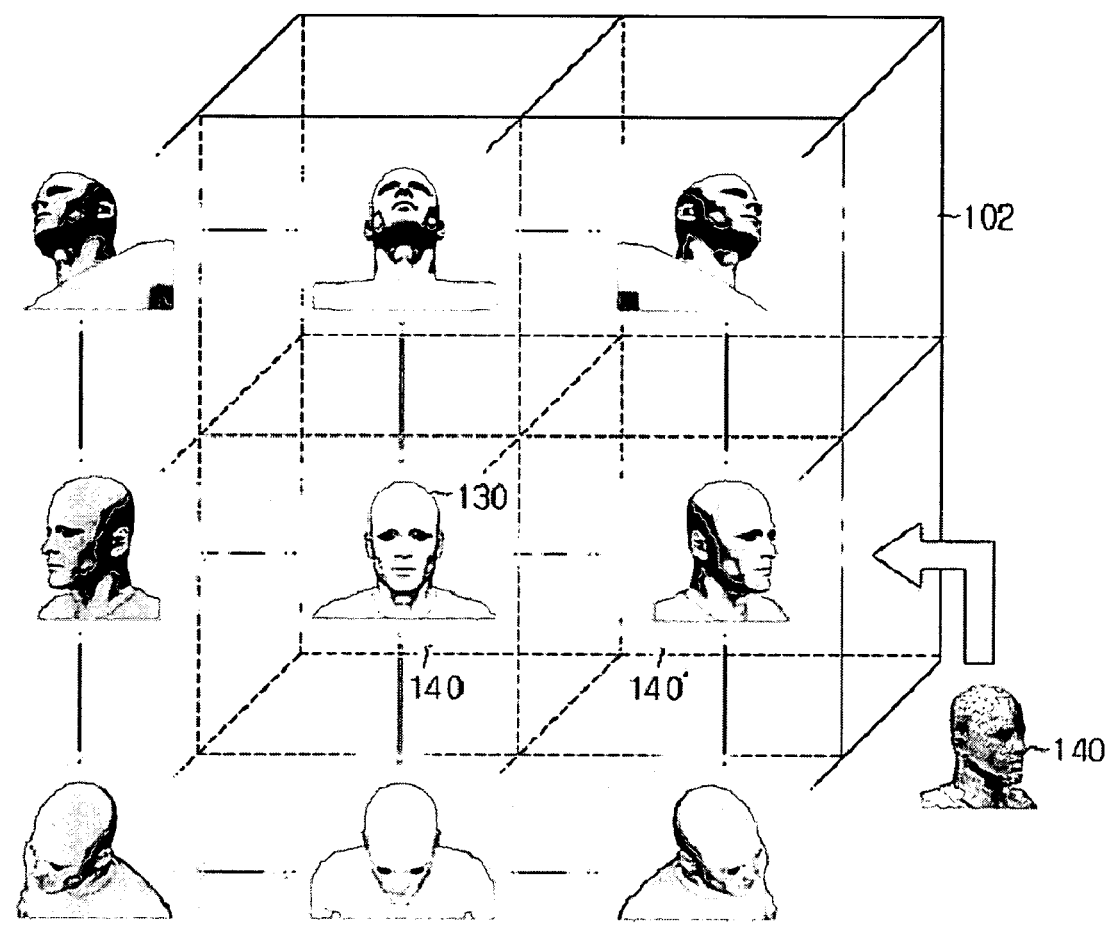
FIG. 5 is a view illustrating a mapping relation between 3D and 2D characters according to views of the camera in accordance with the character setup of the present invention.

FIG. 5 is a detailed view of FIG. 4, in which an arrangement of key drawings of the 2D character 130 according to the camera locations 104, 104', ... is exampled. The key drawings of the 2D character 130 are determined after identifying an appearance of the 3D character 140 taken by the camera according to the camera locations.

Figure 6:
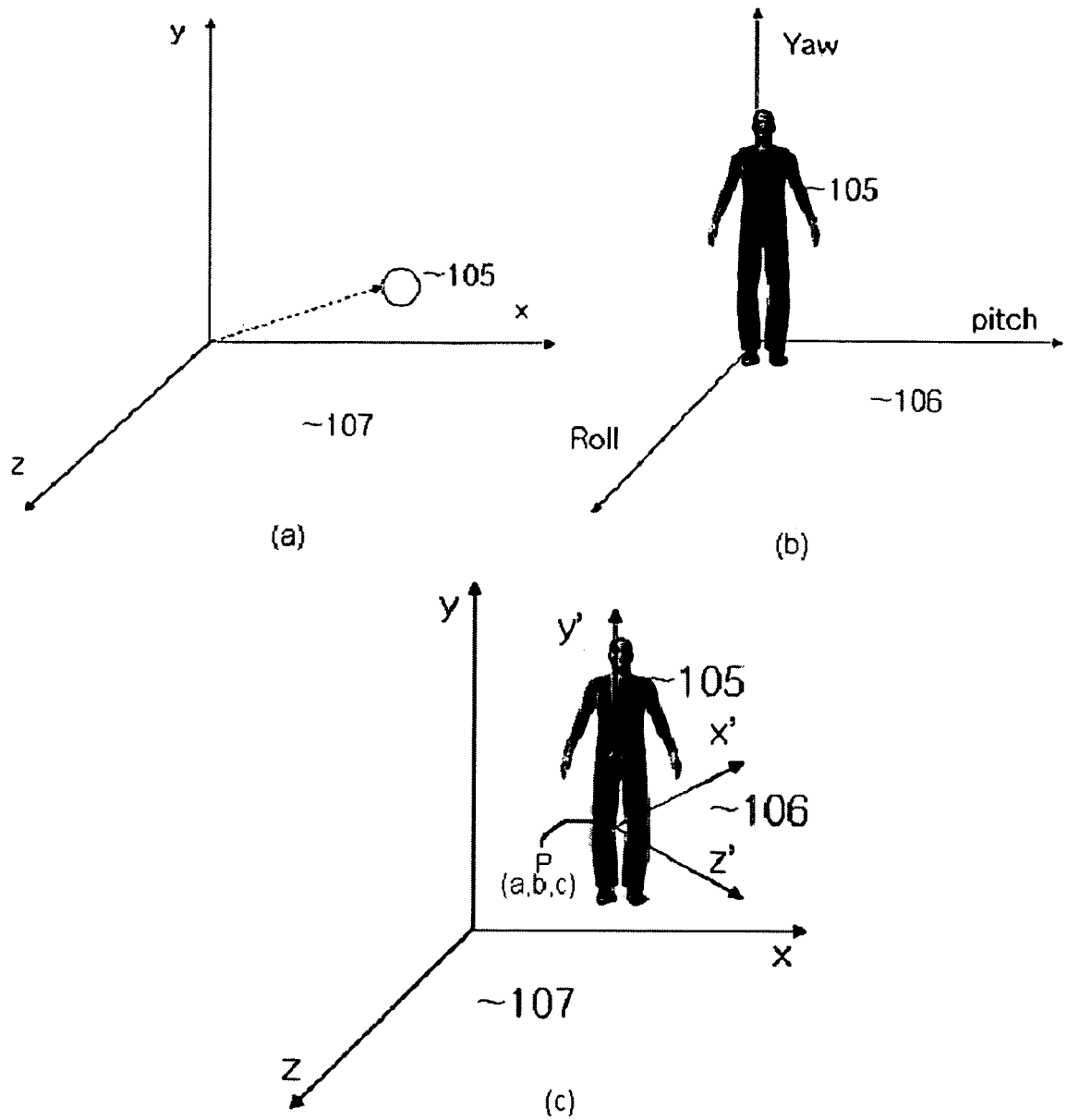
FIG. 6 is a view illustrating a change of camera and character coordinates according to the present invention.

In FIG. 6, (a) shows a coordinate 107 of a space of the camera, (b) shows a coordinate 106 of the character 105, and (c) shows a converted coordinate for the character appearance and motion when the coordinates 106 and 107 are disposed in an identical space. The (a) is a world coordinate and the (b) is a character coordinate. The character can rotate about a roll, pitch and yaw axes.

When the character is on the world coordinate, as shown in the coordinate (c), the character is located at a point P (a, b, c) away from a point of origin of the world coordinate 107 and the coordinate axes are different from each other. Therefore, the character coordinate 106 must be converted into the world coordinate 107. To convert the character coordinate 106 into the world coordinate 107, a representation of the character in the 3D space and a point P that is a reference of the animation must be identified. To identify the point P, the movement T and rotation R values must be identified. Since the location P where the point of origin of the character coordinate 106 is located in the world coordinate 107 is identified, the movement value T can be calculated by forming the P as a vector. The rotation value R is calculated from the following equation 1 using the orientation angle and movement value T of the character.

$$R = \begin{bmatrix} & & & 0 \\ |y \times Ori| & |Ori \times (y \times Ori)| & |Ori| & 0 \\ & & & 0 \\ 0 & 0 & 0 & 1 \end{bmatrix} \cdot T \quad \text{[Equation 1]}$$

FIG. 7 is a view of the human body divided by regions for representing the 2D character 130.

In the present invention, the human body is divided into 6 regions such as a center body 131, a head 132, a right hand 133, a left hand 134, a right foot 135, and a left foot 136. When the 2D character is drawn, it is drawn with reference to the center body 131 and the drawing order of the regions are determined by determining if each end-effect of each region is closer than the center body to the camera with reference to the camera view. The drawing starts from a region farthest from the camera and ends at a region closest to the camera.

Figure 8:
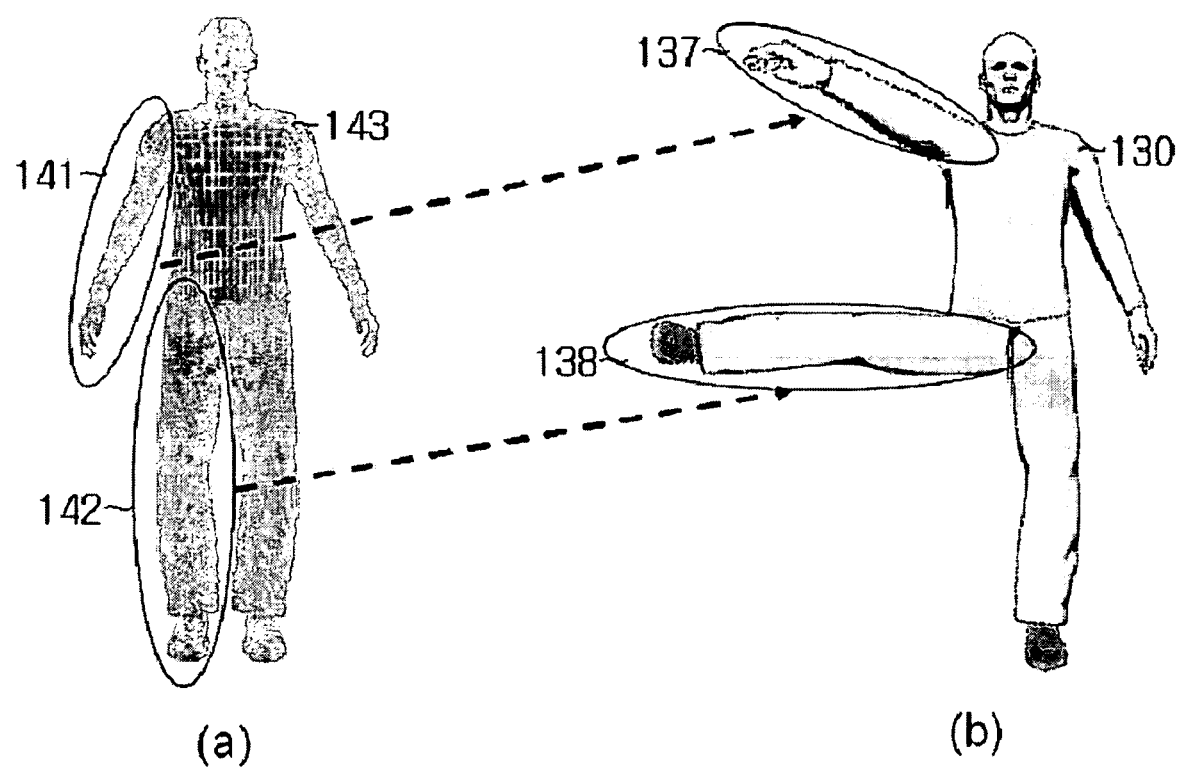
FIG. 8 is a view of a mapping result for a 3D motion and an exaggerated 2D motion according to the present invention.

In order for the 2D character to be exaggerated like cartoon as shown in FIG. 10b illustrating a final 2D character animation, as shown in FIG. 8, a key drawing (b) of the 2D character 130 is intentionally mapped to be exaggerated when the key drawing (b) of the 2D character 130 is mapped in response to the motions (a) of the camera and the 3D character 143. In order to apply the motions (a) of the right hand 141 and right foot 142 of the 3D character 143 to the key drawing (b) of the 2D character 130, drawings of modified right hand 141 and right foot 142 of the 2D character 130 are used to exaggerate and map the right hand 141 and right foot 142. The mapped data is stored in the motion database 36.

The pre-processing operation is described with reference to FIGS. 2 through 8. After the data is prepared through the aforementioned pre-processing operation, the animation is produced by the process of FIG. 1.

Figure 9:
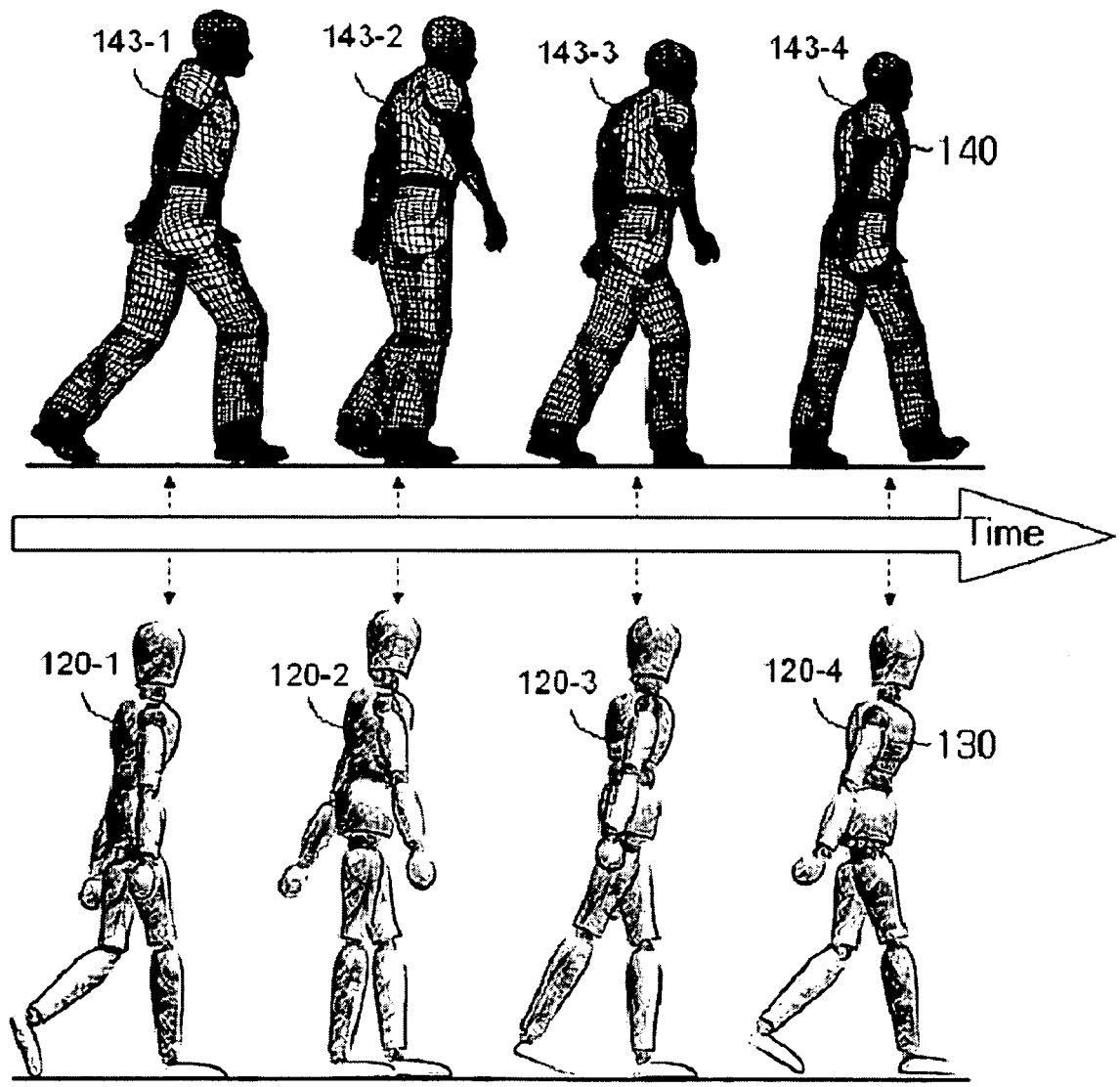
FIG. 9 is a view of an mapping example of a key frame selected from a 3D animation and an image of a 2D character according to time.

FIG. 9 shows an intermediate process for selecting key frames 143-1, 143-2, 143-3, and 143-4 of the 3D character 140 from the 3D character data according to the times T-1, T-2, T-3, and T-4, arranging key drawings of the 2D character 130 corresponding to the key frames 143-1, 143-2, 143-3, and 143-4 according to the animation order in accordance with the times T-1, T-2, T-3, and T-4 after extracting the same from the database 23, and interpolating frames into a space between the key frames through the in-betweeing operation.

Figure 10:
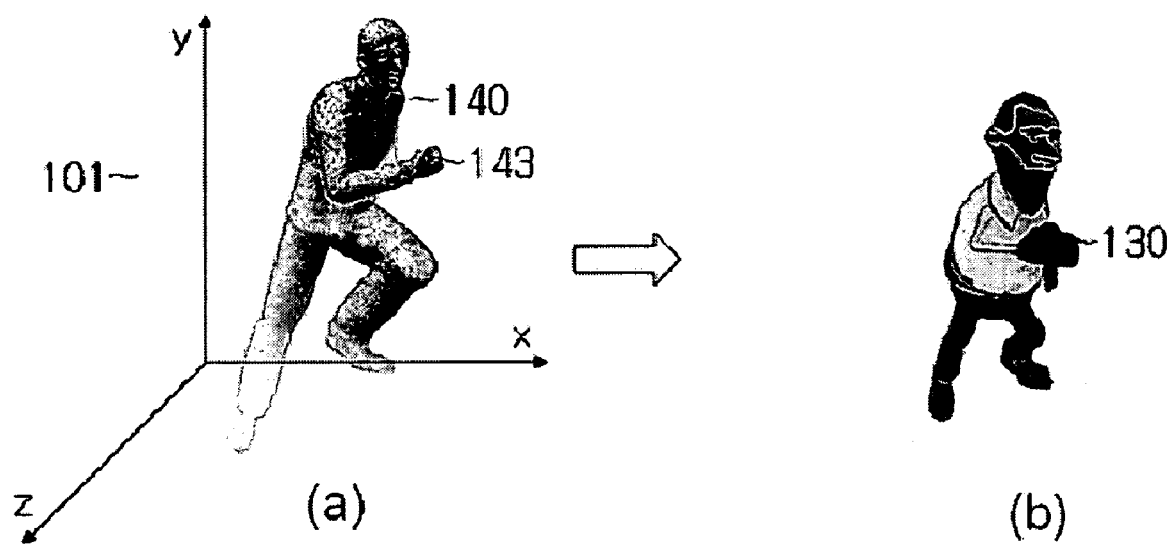
FIG. 10 is a view of an animation result of a 2D humanoid character in a 3D space according to the present invention.

FIG. 10 shows a final appearance (b) obtained by mapping a motion (a) of the 3D character 140 with the key drawings of the 2D character 130 by the intermediate process of FIG. 9.

Therefore, the character animation producing method of the present invention can be applied to internet-based applications, virtual reality systems and computer games.

In addition, the method can be programmed so that it can be read by a computer. This program can be stored in a variety of recording media such as CD ROMs, ROMs, RAMs, floppy disks, hard disks, and optical magnetic disks.

As described above, the present invention is directed to a method of representing the 2D character in the 3D space like the 3D character and a method of animating the 2D character by mapping the same as the 2D motion of the 2D character using the 3D motion data used in the 3D character animation. That is, the present invention is directed to a method of producing the 2D animation by mapping the 2D character animation as the 2D motion using the motion capture data, thereby providing the 2D animation having the cartoon-like exaggeration. In addition, the reuse of the motions, which was difficult in the conventional 2D animation, becomes possible by constructing a database having the information of the motions.

The character animation producing method of the present invention can be applied to internet-based applications, virtual reality systems and computer games as well as the animation production. Furthermore, when the character animation producing method is associated with a chroma-key technology, advantages of both 2D and 3D animations can be obtained.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of representing and animating a 2D (Two-Dimensional) humanoid character according to views of the humanoid character in a 3D (Three-Dimensional) space comprising:
    performing a pre-processing operation including a character setup operation and a motion data setup operation that prepares and stores data of a 3D humanoid character; and
    producing a 2D character animation of the 3D humanoid character using the stored data;
    wherein performing a character setup operation includes obtaining from a camera in the 3D space camera views of the 3D humanoid character and storing the views in a character database; and
    wherein performing a motion data setup operation includes analyzing a 3D character animation of the 3D humanoid character, extracting mapping information that maps the 3D character animation into a 2D character animation, and storing the mapping information in a motion database.

2. The method of claim 1, wherein producing the character animation includes:
    searching and extracting key frame data from the motion database, the key frame data corresponding to location information of a camera and a posture of the humanoid character in the 3D space determined by an animation producer;
    converting coordinate using the location information of the camera and a motion value that is obtained at each key frame extracted from the motion database;
    searching key drawings of a character obtained from the conversion of the coordinate from the character database;
    converting the key drawings corresponding to the frames after searching a drawing order for body regions corresponding to the key drawings of the searched character from the motion data base; and
    performing an in betweening operation in which frames are interpolated in a space between a current key frame and a next key frame.

3. The method of claim 1, wherein the performing the character setup operation includes:
    setting a plurality of locations according to virtual camera locations in the 3D space;
    preparing a key drawing of the 2D character from an appearance of the character obtainable from the virtual camera locations;
    dividing the key drawing of the 2D character into appearances of the character that can be obtainable at the 26virtual camera locations; and
    storing the divided key drawings in the character database.

4. The method of claim 3, wherein the appearances of the humanoid character correspond to the respective body regions in order to maintain a hierarchy structure of the 3D humanoid character, and are stored in the database.

5. The method of claim 1, wherein the data stored in the motion database is one of a motion capture data and a character animation data produced by a 3D key frame method.

6. The method of claim 1, wherein the performing the motion data setup operation includes:
    extracting key frames from a 3D character animation data;
    extracting, when the extracted key frame data is applied to the 3D humanoid character, the mapping information after searching the camera information of the 2D humanoid character from the character database considering a camera angle and a character orientation;
    determining a drawing order for body regions of the 2D humanoid character after analyzing a posture of the 3D character corresponding to the extracted key frame motion; and
    storing the mapping-relation information and the drawing order in a motion database.

7. The method of claim 6, wherein the drawing order is set such that the drawing starts from a region farthest from the camera and ends at a region closest to the camera by determining if each end-effect of each region is closer than the center body to the camera with reference to the camera view.

* * * * *